(12) United States Patent
Syed et al.

(10) Patent No.: US 11,884,166 B2
(45) Date of Patent: *Jan. 30, 2024

(54) BATTERY PACK REINFORCEMENT ASSEMBLIES

(71) Applicant: FORD GLOBAL TECHNOLOGIES, LLC, Dearborn, MI (US)

(72) Inventors: Shamsuddin A. Syed, Canton, MI (US); Ihab Grace, Grosse Pointe Woods, MI (US); Mumtaz Hussain, Woodhaven, MI (US); David J. Pfeiffer, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,808

(22) Filed: Jan. 7, 2022

(65) Prior Publication Data

US 2022/0131223 A1    Apr. 28, 2022

Related U.S. Application Data

(63) Continuation of application No. 16/749,088, filed on Jan. 22, 2020, now Pat. No. 11,258,128.

(51) Int. Cl.
*B60L 50/00* (2019.01)
*B60L 50/64* (2019.01)
*B60L 50/60* (2019.01)

(52) U.S. Cl.
CPC ............. *B60L 50/64* (2019.02); *B60L 50/66* (2019.02)

(58) Field of Classification Search
CPC ........... B60L 50/54; B60L 50/66; B60L 50/00

USPC ............................................. 180/68.5
See application file for complete search history.

(56) References Cited

U.S. PATENT DOCUMENTS

| 5,501,289 | A  | * | 3/1996  | Nishikawa ............... B60K 1/04 280/783 |
| 7,540,343 | B2 |   | 6/2009  | Nakashima et al. |
| 8,646,830 | B2 |   | 2/2014  | Hettinger et al. |
| 8,967,312 | B2 |   | 3/2015  | Yanagi |
| 9,505,442 | B2 | * | 11/2016 | Wu ............................ B60K 1/04 |
| 9,821,852 | B2 | * | 11/2017 | Akhlaque-E-Rasul ....... B62D 25/2036 |

(Continued)

FOREIGN PATENT DOCUMENTS

| CN | 109094349 A    | 12/2018 |
| DE | 102011120960 A1 | 4/2013 |

(Continued)

*Primary Examiner* — Hau V Phan
(74) *Attorney, Agent, or Firm* — David B. Kelley; Carlson, Gaskey & Olds, P.C.

(57) ABSTRACT

Reinforcement assemblies and associated methods are provided for reinforcing a battery pack of an electrified vehicle. An exemplary battery pack may include a battery internal component (e.g., a battery array), an enclosure assembly for housing the battery internal component, and a reinforcement assembly secured to the enclosure assembly. The reinforcement assembly may include a beam and a bracket secured to the beam. The reinforcement assembly may be positioned at expected high impact load locations of the enclosure assembly and is configured for absorbing and transferring energy during vehicle impact loading events, thereby minimizing transfer of the impact loads inside the battery pack where relatively sensitive battery internal components are housed.

20 Claims, 6 Drawing Sheets

(56) References Cited

U.S. PATENT DOCUMENTS

| | | | |
|---|---|---|---|
| 10,431,789 B2* | 10/2019 | Lucchesi | H01M 50/20 |
| 10,494,030 B1* | 12/2019 | Paramasivam | B60K 1/04 |
| 10,647,213 B2* | 5/2020 | Otoguro | B60K 1/04 |
| 11,258,128 B2* | 2/2022 | Syed | H01M 50/249 |
| 2006/0113131 A1 | 6/2006 | Kato et al. | |
| 2007/0007060 A1 | 1/2007 | Ono et al. | |
| 2008/0196957 A1* | 8/2008 | Koike | B60L 50/66 |
| | | | 180/68.5 |
| 2010/0213741 A1 | 8/2010 | Suzuki et al. | |
| 2011/0068606 A1 | 3/2011 | Klimek et al. | |
| 2012/0040237 A1 | 2/2012 | Hamada et al. | |
| 2012/0161472 A1 | 6/2012 | Rawlinson et al. | |
| 2012/0247850 A1* | 10/2012 | Hashimoto | H01M 50/224 |
| | | | 180/68.5 |
| 2013/0026786 A1 | 1/2013 | Saeki | |
| 2013/0057025 A1 | 3/2013 | Cabo | |
| 2013/0088045 A1 | 4/2013 | Charbonneau et al. | |
| 2013/0192914 A1 | 8/2013 | Nakamori | |
| 2014/0284125 A1* | 9/2014 | Katayama | B60L 58/21 |
| | | | 180/68.5 |
| 2016/0099451 A1* | 4/2016 | Murai | H01M 50/509 |
| | | | 429/54 |
| 2017/0305250 A1* | 10/2017 | Hara | H01M 50/204 |
| 2018/0050607 A1* | 2/2018 | Matecki | B60K 1/04 |
| 2018/0337374 A1* | 11/2018 | Matecki | H01M 50/271 |
| 2018/0337377 A1* | 11/2018 | Stephens | B60L 50/64 |
| 2018/0337378 A1* | 11/2018 | Stephens | B60L 50/64 |
| 2019/0092395 A1* | 3/2019 | Makowski | H01M 50/249 |
| 2019/0263276 A1* | 8/2019 | Otoguro | B62D 25/20 |

FOREIGN PATENT DOCUMENTS

| | | |
|---|---|---|
| DE | 102012017879 A1 | 3/2014 |
| DE | 102012019922 A1 | 4/2014 |

* cited by examiner

BATTERY PACK REINFORCEMENT ASSEMBLIES

CROSS-REFERENCE TO RELATED APPLICATIONS

This is a continuation of U.S. patent application Ser. No. 16/749,088, filed on Jan. 22, 2020.

TECHNICAL FIELD

This disclosure relates generally to electrified vehicle battery packs, and more particularly to battery pack reinforcing assemblies for effectively managing load paths during vehicle impact loading events.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. The battery pack may be susceptible to various vehicle loads, including loads that are imparted during vehicle impact loading events (e.g., front, side, side pole, rear, etc.) during operation of the electrified vehicle.

SUMMARY

A battery pack according to an exemplary aspect of the present disclosure includes, among other things, a battery internal component, an enclosure assembly including an interior arranged to house the battery internal component, and a reinforcement assembly. The reinforcement assembly includes a beam mounted to the enclosure assembly and a bracket mounted to the beam. The reinforcement assembly is configured to transfer impact loads away from the interior of the enclosure assembly during impact loading events.

In a further non-limiting embodiment of the foregoing battery pack, the battery internal component is a battery array that includes a plurality of battery cells.

In a further non-limiting embodiment of either of the foregoing battery packs, the beam is an extruded metallic tube having a hollow channel.

In a further non-limiting embodiment of any of the foregoing battery packs, the bracket is a C-shaped metallic bracket.

In a further non-limiting embodiment of any of the foregoing battery packs, the beam includes an inboard side surface, an outboard side surface, an upper surface, and a lower surface.

In a further non-limiting embodiment of any of the foregoing battery packs, the upper surface or the lower surface includes a depression that establishes a groove, and a bent portion of the bracket is received within the groove.

In a further non-limiting embodiment of any of the foregoing battery packs, the inboard side surface includes a first plurality of openings and the outboard side surface includes a second plurality of openings. The second plurality of openings includes a greater number of openings than the first plurality of openings.

In a further non-limiting embodiment of any of the foregoing battery packs, the inboard side surface includes a plurality of openings, and the outboard side surface includes a first plurality of openings and a second plurality of openings that are shaped differently than the first plurality of openings.

In a further non-limiting embodiment of any of the foregoing battery packs, a locating feature of the bracket is received within a first opening of the first plurality of openings and a bolt is received within a second opening of the second plurality of openings.

In a further non-limiting embodiment of any of the foregoing battery packs, the beam is mounted to a tray of the enclosure assembly.

In a further non-limiting embodiment of any of the foregoing battery packs, the beam is mounted to an exterior surface of the tray, and the exterior surface is located on an outboard, longitudinal side of the battery pack.

In a further non-limiting embodiment of any of the foregoing battery packs, the beam is mounted to a cover of the enclosure assembly.

In a further non-limiting embodiment of any of the foregoing battery packs, a mounting bracket is attached to the enclosure assembly. The reinforcement assembly is unattached to the mounting bracket.

In a further non-limiting embodiment of any of the foregoing battery packs, the beam includes a first length that is less than a second length of the enclosure assembly.

In a further non-limiting embodiment of any of the foregoing battery packs, a second reinforcement assembly is mounted to the enclosure assembly at a different location than the reinforcement assembly.

A method according to another exemplary aspect of the present disclosure includes, among other things, mounting a beam of a reinforcement assembly to an enclosure assembly of a battery pack, mounting a bracket of the reinforcement assembly to the beam, and securing the battery pack to an electrified vehicle. The reinforcement assembly is configured to redirect impact loads in response to a vehicle impact loading event, thereby minimizing the transfer of the impact loads into an interior of the enclosure assembly.

In a further non-limiting embodiment of the foregoing method, mounting the beam includes bolting or welding the beam to a tray of the enclosure assembly.

In a further non-limiting embodiment of either of the foregoing methods, mounting the bracket includes bolting or welding the bracket to an outboard side surface of the beam.

In a further non-limiting embodiment of any of the foregoing methods, the method includes sliding the bracket within a groove of the beam prior to mounting the bracket at a desired location relative to the beam.

In a further non-limiting embodiment of any of the foregoing methods, securing the battery pack to the electrified vehicle includes securing the battery pack to an underbody of the electrified vehicle with a mounting bracket. The reinforcement assembly is unattached to the mounting bracket.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details reinforcement assemblies and associated methods for reinforcing a battery pack of an electrified vehicle. An exemplary battery pack may include a battery internal component (e.g., a battery array), an enclosure assembly for housing the battery internal component, and a reinforcement assembly secured to the enclosure assembly. The reinforcement assembly may include a beam and a bracket secured to the beam. The reinforcement assembly may be positioned at expected high impact load locations of the enclosure assembly and is configured for absorbing and transferring energy during vehicle impact loading events, thereby minimizing transfer of the impact loads inside the battery pack where relatively sensitive battery internal components are housed. These and other features are discussed in greater detail in the following paragraphs of this detailed description.

Figure 1:
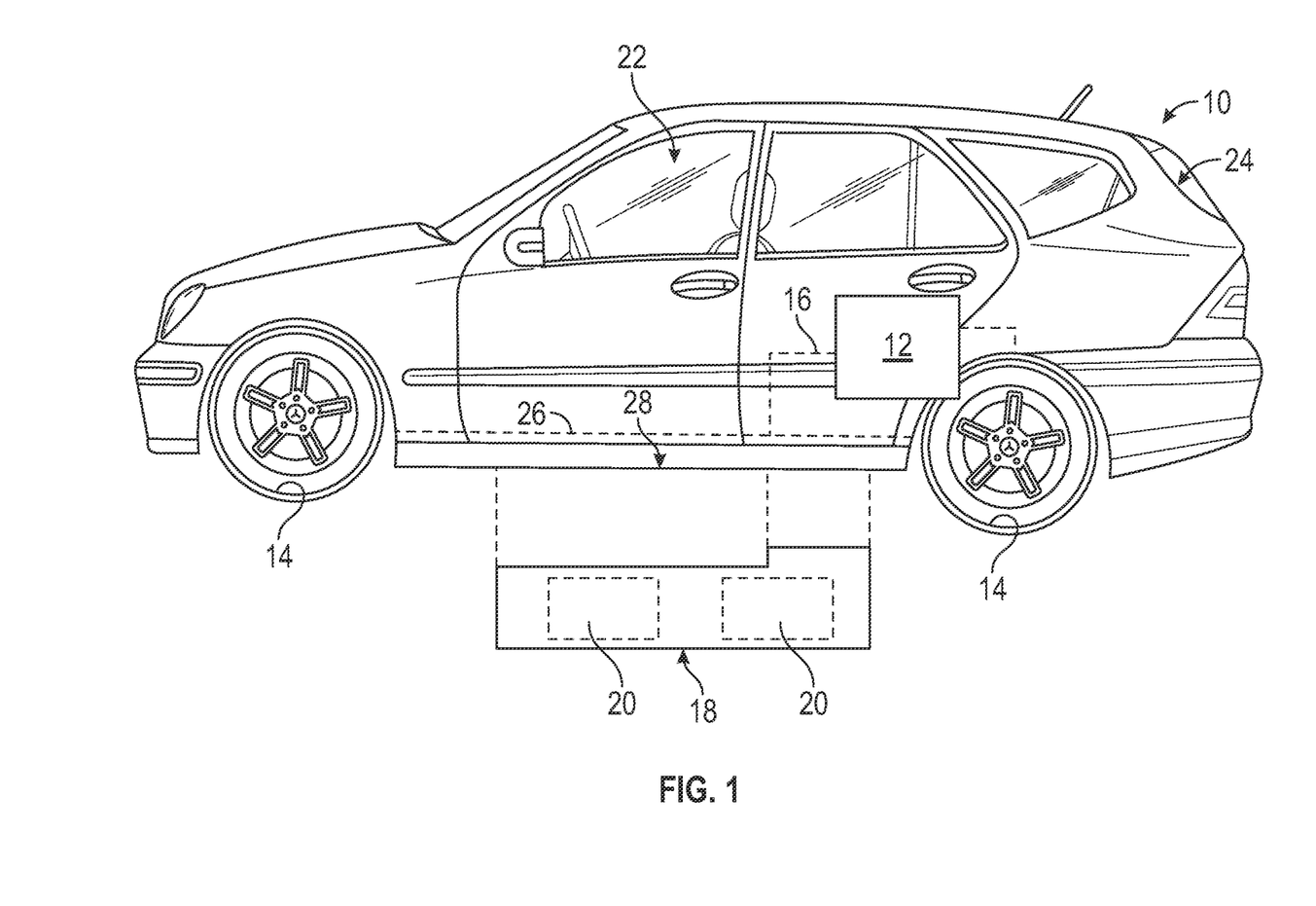
FIG. 1 schematically illustrates an electrified vehicle.
Figure 2:
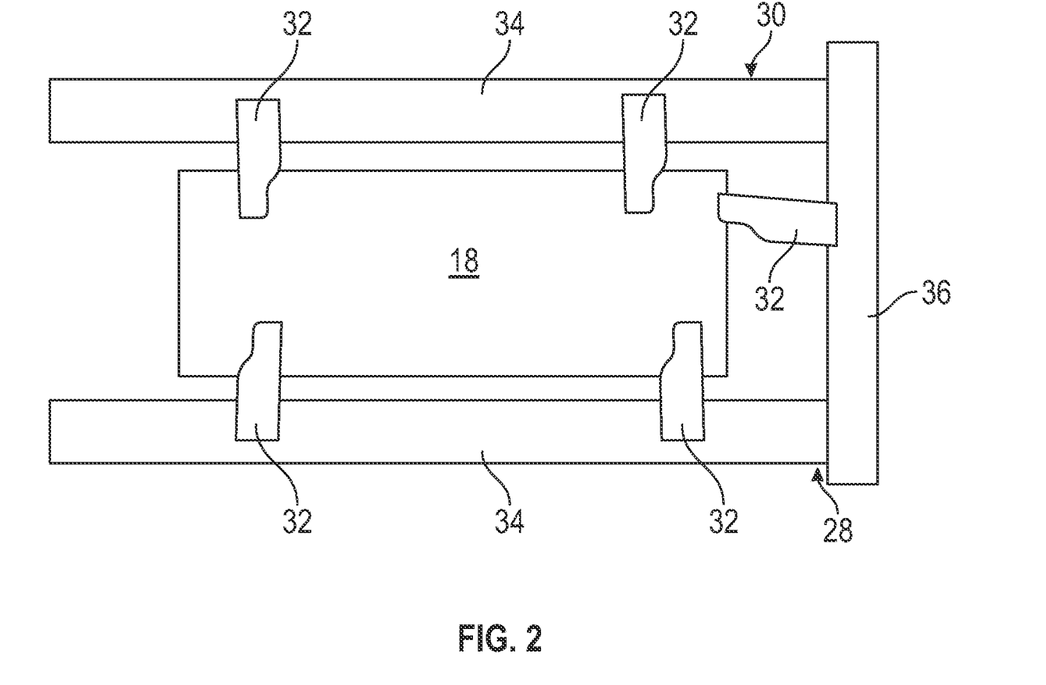
FIG. 2 illustrates select portions of an underside of the electrified vehicle of FIG. 1.

FIGS. 1 and 2 schematically illustrates an electrified vehicle 10. The electrified vehicle 10 could be a car, a truck, a van, a sport utility vehicle, a crossover, or any other type of vehicle that includes an electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEVs), fuel cell vehicles, etc. Therefore, although not specifically shown in this embodiment, the electrified vehicle 10 could be equipped with an internal combustion engine that can be employed either alone or in combination with other energy sources to propel the electrified vehicle 10.

Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to show certain details of a particular component.

In the illustrated embodiment, the electrified vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14 of the electrified vehicle 10.

A voltage bus 16 electrically connects the electric machine 12 to a battery pack 18. The battery pack 18 is an exemplary electrified vehicle battery. The battery pack 18 may be a high voltage traction battery pack that includes a plurality of battery arrays 20 (i.e., battery assemblies or groupings of rechargeable battery cells) capable of outputting electrical power to operate the electric machine 12 and/or other electrical loads of the electrified vehicle 10. Other types of energy storage devices and/or output devices can also be used to electrically power the electrified vehicle 10.

The battery pack 18 may be mounted at various locations of the electrified vehicle 10. In an embodiment, the electrified vehicle 10 includes a passenger cabin 22 and a cargo space 24 (e.g., a trunk) located to the rear of the passenger cabin 22. A floor pan 26 may separate the passenger cabin 22 from a vehicle frame 28, which generally establishes the vehicle underbody 30 (best shown in FIG. 2). The battery pack 18 may be suspended from or otherwise mounted to the vehicle frame 28 such that it is remote from both the passenger cabin 22 and the cargo space 24. The battery pack 18 therefore does not occupy space that would otherwise be available for carrying passengers or cargo. In an embodiment, the battery pack 18 is suspended from the vehicle frame 28 by a mounting system that includes a plurality of mounting brackets 32 (see FIG. 2).

The vehicle frame 28 (sometimes referred to simply as a "frame") is the main supporting structure of the electrified vehicle 10, to which various components are attached, either directly or indirectly. The vehicle frame 28 may include a unibody construction, in which the chassis and body of the electrified vehicle are integrated into one another, or may be part of a body-on-frame construction. The vehicle frame 28 may be made of a metallic material, such as steel, carbon steel, or an aluminum alloy, as non-limiting examples.

The vehicle frame 28 includes a plurality of rails 34 (sometimes referred to as "frame rails" or "beams"). The rails 34 extend longitudinally (i.e. in parallel with a length of the electrified vehicle 10). One or more cross members 36 may extend between the rails 34 of the vehicle frame 28. The cross members 36 generally extend transversely relative to the rails 34.

The mounting brackets 32 may be mounted to the rails 34, the cross members 36, or both. In an embodiment, each mounting bracket 32 is mounted to the battery pack 18 and at least one of the rails 34 or at least one of the cross members 36. The mounting brackets 32 may be welded or bolted to the battery pack 18 and to at least one of the rails 34 and/or the cross members 36. The total number and configuration of the mounting brackets 32 used to mount the battery pack 18 relative to the underbody 30 may vary per vehicle design and is therefore not intended to limit this disclosure.

Due at least in part to its mounting location at the underbody 30, the battery pack 18 may be susceptible to various vehicle loads including, but not limited to, impact loads (e.g., loads imparted during vehicle impact and running clearance events, for example), durability loads, and inertial loads. If not isolated or redirected, these impact loads could be transferred directly into the battery pack 18, which could, in turn, generate large forces that can be damaging to the relatively sensitive internal components (e.g., battery cells of the battery arrays 20, etc.) of the battery pack 18.

Novel reinforcement assemblies for reinforcing the battery pack 18 are therefore proposed in this disclosure. As discussed in greater detail below, the exemplary reinforcement assemblies of this disclosure are capable of absorbing, redirecting, and/or distributing impact loads that may be imparted during vehicle impact loading events (e.g., front, side, side pole, rear, etc.), thereby substantially minimizing the transfer of the impact loads into the battery pack 18.

Figure 3:
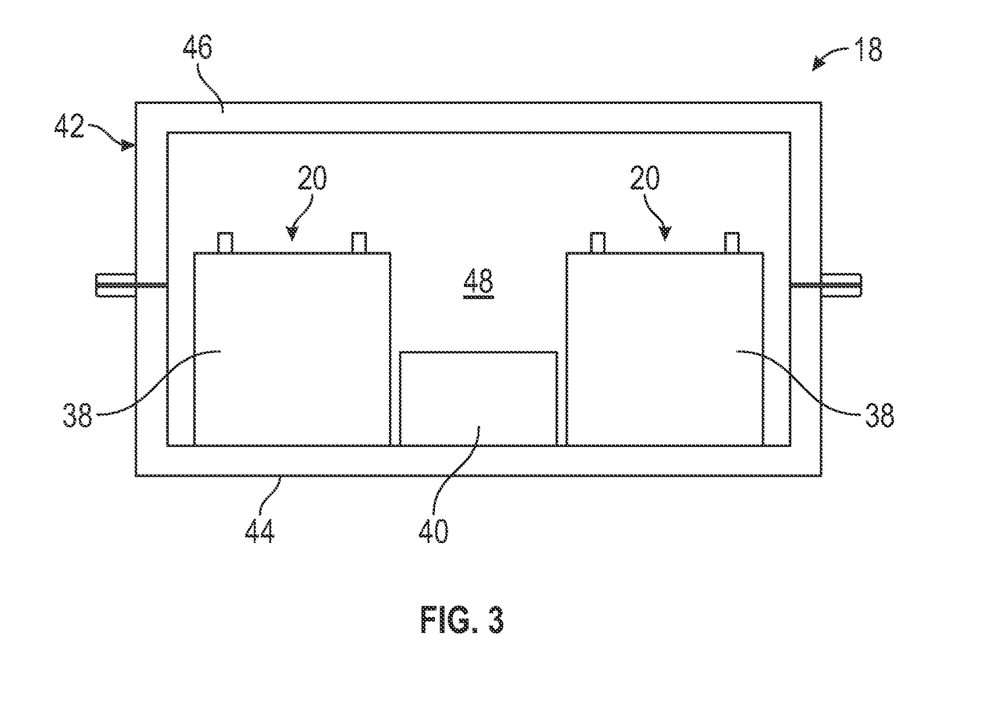
FIG. 3 is a cross-sectional view of an exemplary battery pack of an electrified vehicle.

FIG. 3 is a cross-sectional view of the battery pack 18 of FIG. 1. The battery pack 18 may house a plurality of battery cells 38 that store energy for powering various electrical loads of the electrified vehicle 10, such as the electric machine 12 of FIG. 1, for example. In an embodiment, the battery pack 18 houses prismatic, lithium-ion battery cells. However, battery cells having other geometries (cylindrical, pouch, etc.), other chemistries (nickel-metal hydride, lead-acid, etc.), or both could alternatively be utilized within the scope of this disclosure.

The battery pack 18 may additionally house one or more battery electronic components 40. The battery electronic components 40 could include a bussed electrical center (BEC), a battery electric control module (BECM), wiring harnesses, wiring loops, I/O connectors etc., or any combination of these battery electronic components.

The battery cells 38 may be grouped together in one or more battery arrays 20. In an embodiment, the battery pack 18 includes two battery arrays 20. However, the total numbers of battery cells 38 and battery arrays 20 employed within the battery pack 18 are not intended to limit this disclosure.

An enclosure assembly 42 may house each battery array 20 and battery electronic component 40 of the battery pack 18. Since the battery arrays 20 and the battery electronic components 40 are housed inside the enclosure assembly 42, these components are considered battery internal components of the battery pack 18. The battery internal components are examples of the types of sensitive components that could become damaged if impact loads are transferred inside the battery pack 18 during vehicle impact loading events.

Although an example placement of the battery arrays 20 and the battery electronic components 40 is shown in FIG. 3, this particular placement is not intended to limit this disclosure. The battery internal components of the battery pack 18 can be arranged in any configuration inside the enclosure assembly 42.

In an embodiment, the enclosure assembly 42 is a sealed enclosure. The enclosure assembly 42 may include any size, shape, and configuration within the scope of this disclosure.

The enclosure assembly 42 may include a tray 44 and a cover 46. The tray 44 and the cover 46 cooperate to surround and enclose the battery arrays 20 and the battery electronic components 40. The tray 44 may provide an interior 48 for holding the battery arrays 20 and the battery electronic components 40. After positioning the battery arrays 20 and the battery electronic components 40 within the interior 48, the cover 46 may be seated and sealed to the tray 44 (e.g., at peripheral flanges) to enclose the battery arrays 20 and the battery electronic components 40 inside the enclosure assembly 42.

In an embodiment, the enclosure assembly 42 is a metallic-based component. For example, the tray 44 and the cover 46 could be constructed out of aluminum or steel. However, other materials, including polymer-based materials, may also be suitable for constructing the components of the enclosure assembly 42.

Figure 4:
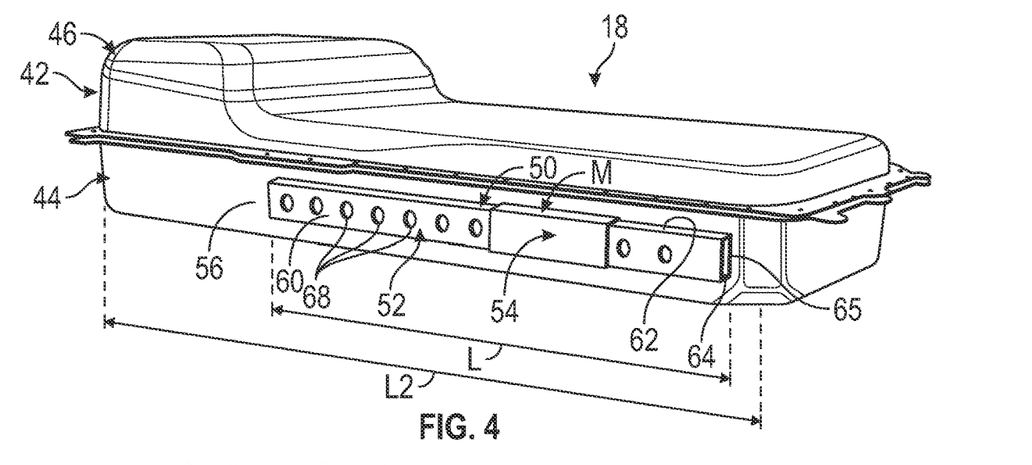
FIG. 4 illustrates a battery pack reinforcement assembly for reinforcing a battery pack of an electrified vehicle.
Figure 5:
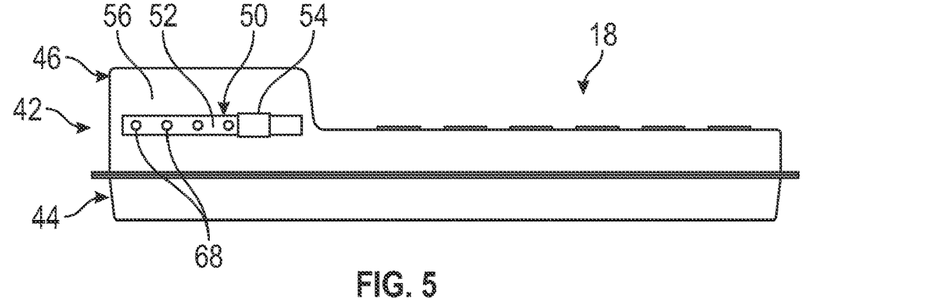
FIG. 5 illustrates another exemplary battery pack reinforcement assembly.

FIG. 4 illustrates an exemplary reinforcement assembly 50 configured for reinforcing the battery pack 18 in a manner that redirects impact loads that may be imparted to the battery pack 18 during vehicle impact loading events. In an embodiment, the reinforcement assembly 50 includes a beam 52 and one or more brackets 54. The beam 52 may be secured (e.g., welded, bolted, glued, etc.) directly to an exterior wall 56 of the enclosure assembly 42 of the battery pack 18, and the bracket(s) 54 may be secured to the beam 52. The exterior wall 56 may be part of any exterior surface of either the tray 44 (see FIG. 4) or the cover 46 (see FIG. 5) of the enclosure assembly 42. Neither the beam 52 nor the bracket 54 is attached to any of the mounting brackets 32 (see, for example, FIG. 7).

The beam 52 may be an extruded metallic tube. For example, the beam 52 could be constructed from aluminum or steel. Other materials and manufacturing techniques could alternatively or additionally be used to manufacture the beam 52 within the scope of this disclosure.

The beam 52 may span across a length L. The actual dimension of the length L could vary depending on the designs of the electrified vehicle and the battery pack. In an embodiment, the length L of the beam 52 is less than a length L2 of the exterior wall 56 of the enclosure assembly 42 to which the beam 52 is mounted.

As shown primarily in FIGS. 4 and 6A-6C, the beam 52 may include a first or inboard side surface 58, a second or outboard side surface 60, an upper surface 62, and a lower surface 64. Together, the first surface 58, the second surface 60, the upper surface 62, and the lower surface 64 circumscribe a hollow channel 65 (see FIG. 6C) of the beam 52. The hollow channel 65 may extend across an entirety of the length L of the beam 52.

Figure 6A:
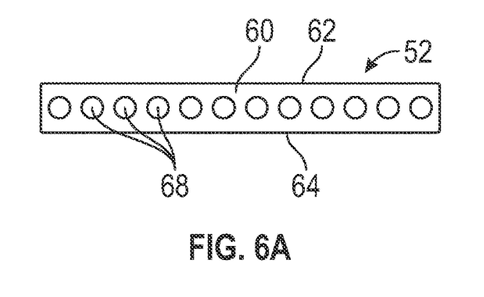
FIGS. 6A, 6B, and 6C are outboard, inboard, and end views, respectively, of a beam of the reinforcement assembly of FIG. 4.
Figure 6B:
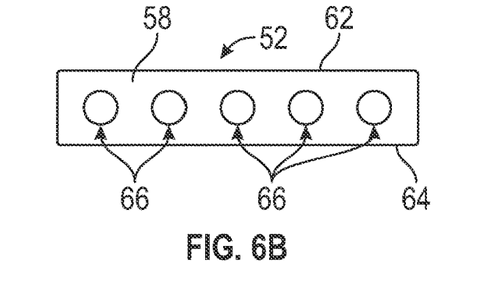
Figure 6C:
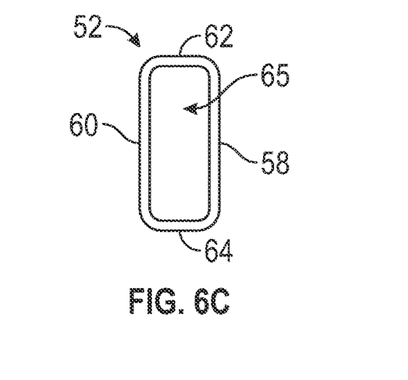

The first surface 58 of the beam 52 may include a first plurality of openings 66, and the second surface 60 of the beam 52 may include a second plurality of openings 68. The first and second pluralities of openings 66, 68 may be configured as either holes or slots and may embody any size or shape. The first plurality of openings 66 may be either aligned or offset from the second plurality of openings 68 when viewed along a plane that extends linearly in a direction from the second surface 60 toward the first surface 58. In an embodiment, the second plurality of openings 68 includes a greater number of openings than the first plurality of openings 66. The positioning and total number of the first and second pluralities of openings 66, 68 provided within the beam 52 is design dependent and may vary depending on various design criteria.

The first plurality of openings 66 may be utilized to attach the beam 52 to the exterior wall 56 of the enclosure assembly 42. For example, the first plurality of openings 66 may receive a fastener 70 (e.g., a bolt or screw, see FIG. 7) or may establish surfaces for forming spot welds or receiving an adhesive between the beam 52 and the exterior wall 56.

The second plurality of openings 68 may be utilized for attaching the bracket 54 to the beam 52. For example, the second plurality of openings 68 may receive a fastener (e.g., bolt or screw) or may establish surfaces for forming spot welds or receiving an adhesive for securing the bracket 54 to the beam 52. The second plurality of openings 68 may also function to reduce the overall weight of the reinforcement assembly 50. Furthermore, as discussed below, the second plurality of openings 68 may locally deform during vehicle impact events, thereby redirecting impact loads away from the interior 48 of the battery pack 18.

The bracket 54 of the reinforcement assembly 50 may be a C-shaped, metallic (e.g., steel or aluminum) bracket. However, other shapes and materials are also contemplated. The bracket 54 may be received in direct contact with each of the second surface 60, the upper surface 62, and the lower surface 64 of the beam 52. The bracket 54 may be secured in place along any portion of the length L of the beam 52. In an embodiment, the bracket 54 is mounted at a location M of the length L. In an embodiment, the location M is an area of the beam 52 where the most significant impact loads are likely to be imparted during vehicle impact events. The location M can vary depending on the vehicle and the battery pack position, among various other design criteria.

Figures 7, 8, 9:
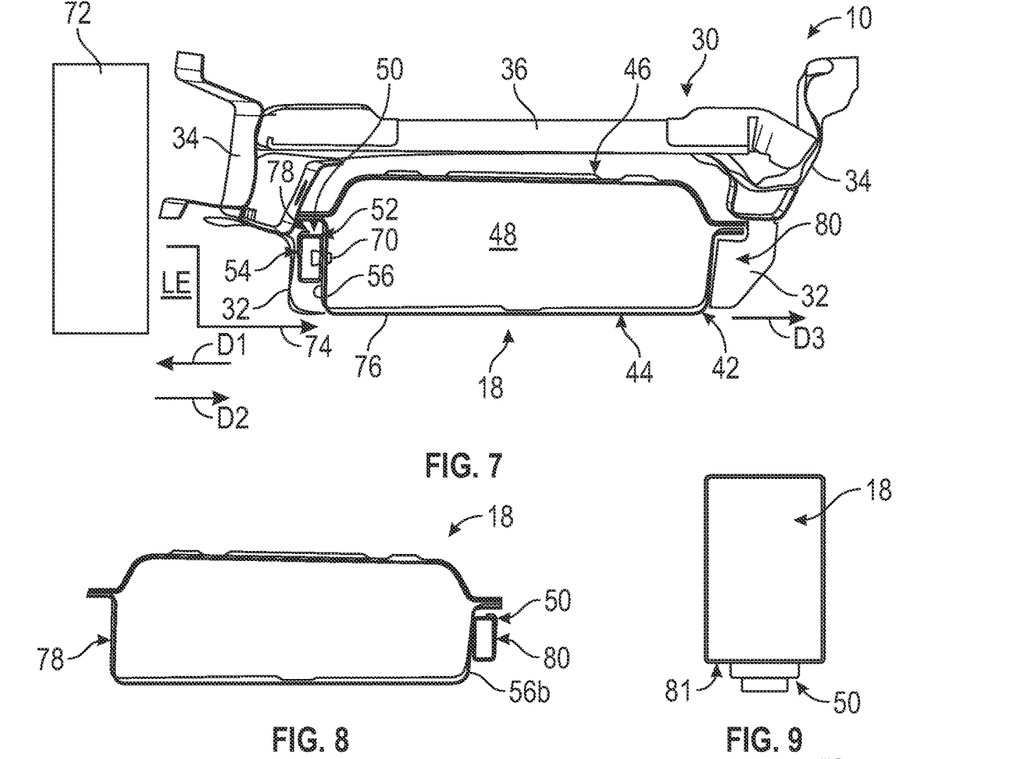
FIG. 7 schematically illustrates the behavior of a battery pack equipped with the reinforcement assembly of FIG. 4 during a vehicle impact loading event.
FIG. 8 illustrates an exemplary placement of a battery pack reinforcement assembly.
FIG. 9 illustrates another exemplary placement of a battery pack reinforcement assembly.

FIG. 7, with continued reference to FIGS. 2, 4, and 6A-6C, schematically illustrates the behavior of a battery pack 18 that is equipped with the reinforcement assembly 50 during a vehicle impact loading event LE. The vehicle impact loading event LE may be a side pole impact event in which the electrified vehicle 10 moves in a direction D1 into an object 72, such as a stationary pole, or the vehicle impact loading event LE may be a side impact loading event in which the object 72, such as another vehicle, moves in a direction D2 into a side of the electrified vehicle 10. In either case, during the vehicle impact loading event LE, impact loads 74 are absorbed by the reinforcement assembly 50, which may provide local energy absorption zones via the second plurality of openings 68, without transferring the impact loads 74 to the exterior wall 56 of the enclosure assembly 42. The reinforcement assembly 50 therefore significantly reduces the intrusion of the impact loads 74 into the enclosure assembly 42 where the battery sensitive components are housed. Furthermore, the reinforcement assembly 50 helps to direct the impact loads 74 toward stiffer portions (e.g., a bottom area 76 of the tray 44) of the enclosure assembly 42. The battery pack 18 may be pushed away from the impact zone (see direction indicated by arrow D3) rather than experiencing localized deformation. In an embodiment, the second plurality of openings 68 provide for local deformation of the beam 52 during the vehicle impact loading event LE and enable a sufficient amount of stiffness for redirecting the impact loads 74 away from the interior 48 of the battery pack 18. The reinforcement assembly 50 is thus configured to minimize the transfer of the impact loads 74 into the walls of the enclosure assembly 42, thereby protecting the battery sensitive internal components housed therein.

In the embodiments described above, the reinforcement assembly 50 is mounted to the exterior wall 56, which is located on an outboard, longitudinal side 78 (i.e., extending in parallel with a length of the electrified vehicle 10) of the battery pack 18. However, other configurations are also contemplated within the scope of this disclosure. For example, in another embodiment, the reinforcement assembly 50 could be mounted to an exterior wall 56B that is located on an inboard, longitudinal side 80 of the battery pack 18 (see FIG. 8), or in yet another embodiment, the reinforcement assembly 50 could be mounted to an exterior wall 56C that is located at a laterally extending end 81 (i.e., extending in parallel with a width of the electrified vehicle 10) of the battery pack 18 (see FIG. 9). Therefore, the mounting location of the reinforcement assembly 50 is not intended to limit this disclosure.

Figure 10:
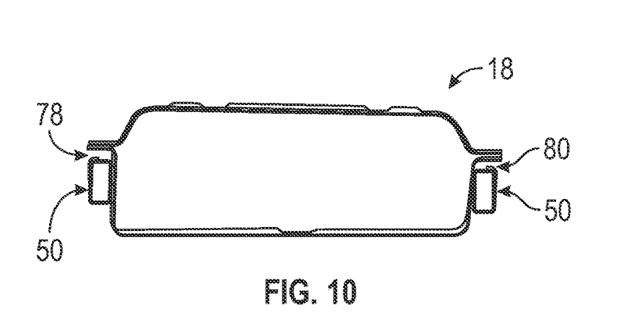
FIG. 10 illustrates a battery pack that includes multiple reinforcement assemblies.
Figure 11:
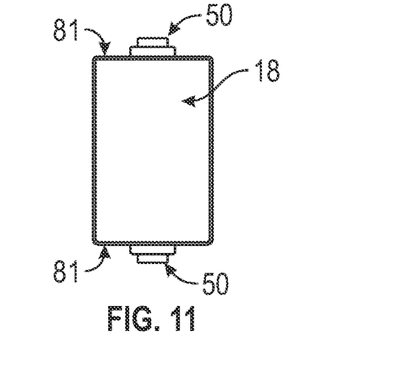
FIG. 11 illustrates another exemplary battery pack with multiple reinforcement assemblies.
Figure 12:
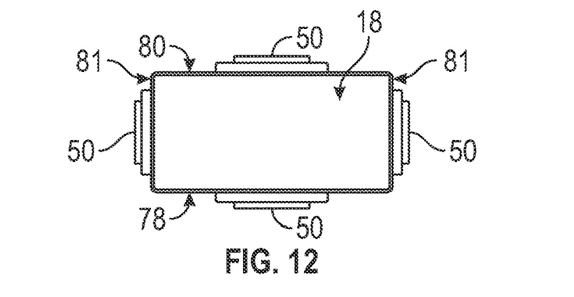
FIG. 12 illustrates yet another exemplary battery pack with multiple reinforcement assemblies.

Furthermore, in the embodiments described above, the battery pack 18 is equipped with a single reinforcement assembly 50 that is mounted to the enclosure assembly 42. However, in alternative embodiments, two or more reinforcement assemblies 50 may be mounted to exterior surfaces of the enclosure assembly 42. For example, in an embodiment, one or more reinforcement assemblies 50 may be mounted at both the outboard, longitudinal side 78 and the inboard, longitudinal side 80 of the battery pack 18 (see FIG. 10), or in another embodiment, one or more reinforcement assemblies 50 may be mounted at both laterally extending ends 81 of the battery pack 18 (see FIG. 11). In yet another embodiment, one or more reinforcement assemblies 50 is mounted at each of the outboard, longitudinal side 78 and the inboard, longitudinal side 80, and at each of the opposing laterally extending ends 81 of the battery pack 18 (see FIG. 12). Therefore, the total number of reinforcement assemblies 50 provided on the battery pack 18 is also not intended to limit this disclosure.

FIGS. 13-16, with continued reference to FIGS. 1-3, illustrate a reinforcement assembly 150 according to another embodiment of this disclosure. Similar to the reinforcement assembly 50 described above, the reinforcement assembly 150 of FIGS. 13-16 may be utilized for reinforcing the battery pack 18 in a manner that redirects impact loads that may be imparted to the battery pack 18 during vehicle impact loading events.

Figure 13:
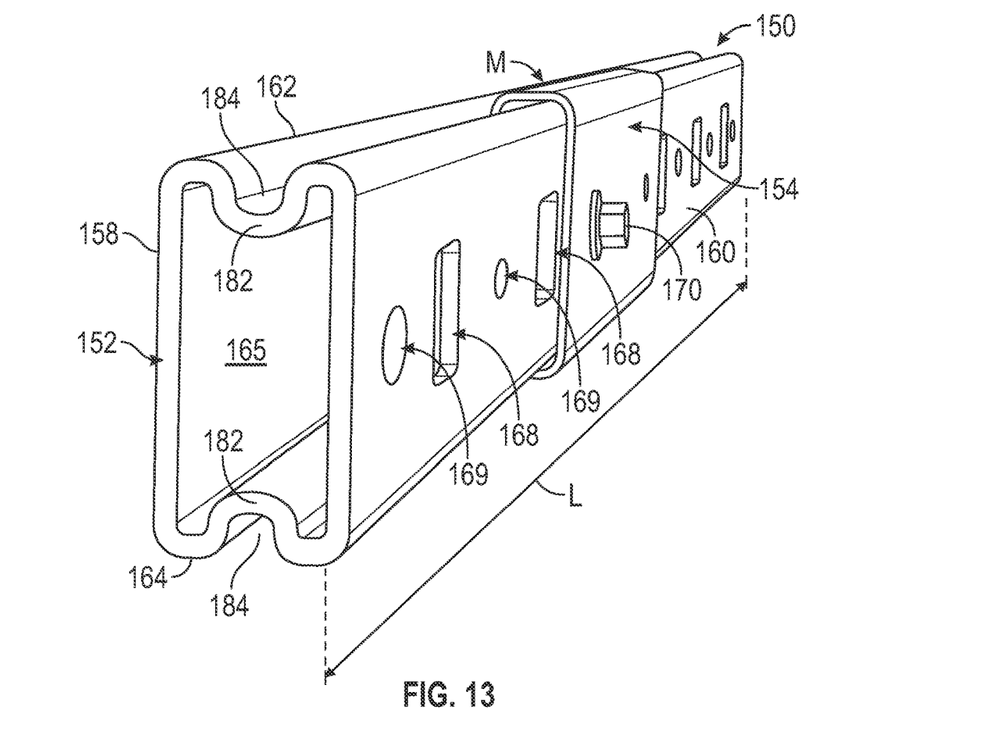
FIG. 13 illustrates another exemplary battery pack reinforcement assembly.

The reinforcement assembly 150 includes a beam 152 and a bracket 154. The beam 152 may be secured (e.g., welded, bolted, glued, etc.) directly to an exterior wall of the enclosure assembly 42 of the battery pack 18, and the bracket 154 may be secured to the beam 152.

The beam 152 may be an extruded metallic tube. For example, the beam 152 could be constructed from aluminum or steel. Other materials and manufacturing techniques could alternatively or additionally be used to manufacture the beam 152 within the scope of this disclosure.

The beam 152 may span across a length L. The actual dimension of the length L could vary depending on the designs of the electrified vehicle and the battery pack.

Figure 14:
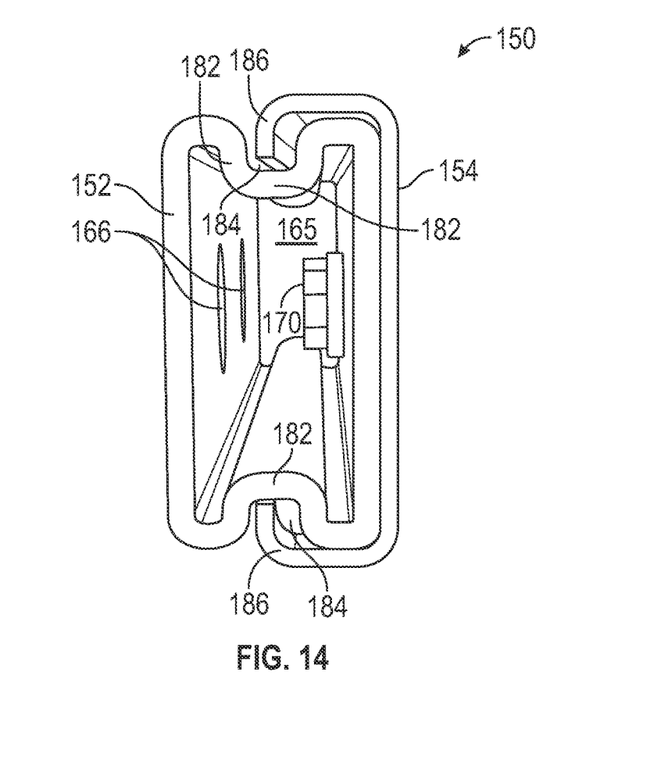
FIG. 14 is a cross-sectional view of the reinforcement assembly of FIG. 13.

The beam 152 may include a first or inboard side surface 158, a second or outboard side surface 160, an upper surface 162, and a lower surface 164. Together, the first surface 158, the second surface 160, the upper surface 162, and the lower surface 164 circumscribe a hollow channel 165 of the beam 152. The hollow channel 165 may extend across an entirety of the length L of the beam 152.

The first surface 158 of the beam 152 may include a plurality of openings 166, and the second surface 160 of the beam 152 may include a first plurality of openings 168 and a second plurality of openings 169. The pluralities of openings 166, 168, 169 may be configured as either holes or slots and may include any size or shape. In an embodiment, the first plurality of openings 168 of the second surface 160 include a different size and shape from the second plurality of openings 169 of the second surface 160. The positioning and total number of the pluralities of openings 166, 168, 169 provided within the beam 152 is design dependent and may depend on various design criteria.

The plurality of openings 166 of the first surface 158 may aid in attaching the beam 152 to the enclosure assembly 42. For example, the plurality of openings 166 may receive a fastener (e.g., a bolt or screw) or may establish surfaces for forming spot welds or receiving an adhesive between the beam 152 and the enclosure assembly 42.

The first and second pluralities of openings 168, 169 may aid in locating and attaching the bracket 154 to the beam 152. For example, the first plurality of openings 168 may be utilized to locate the bracket 154 relative to the bream 152, and the second plurality of openings 169 may be configured to receive fasteners 170 (e.g., bolts or screws) or may establish surfaces for forming spot welds or receiving an adhesive for securing the bracket 154 to the beam 152. The first and second pluralities of openings 168, 169 may also function to reduce the overall weight of the reinforcement assembly 150. Furthermore, the first and second pluralities of openings 168, 169 may locally deform during vehicle impact events, thereby redirecting impact loads away from the interior 48 of the battery pack 18.

The upper surface 162 and the lower surface 164 of the beam 152 may each include a depression 182 that establishes a groove 184 within the beam 152. The grooves 184 may extend across an entirely of the length L of the beam 152. Bent portions 186 of the bracket 154 may be received within the grooves 184, thereby allowing the bracket 154 to slide along the length L of the beam 152 prior to fixedly securing the bracket 154 in place at a desired location of the beam 152.

The bracket 154 of the reinforcement assembly 150 may be a C-shaped, metallic bracket. However, other shapes are also contemplated. In an embodiment, the bracket 154 may be slid along the length L of the beam 152 prior to fixedly mounting the bracket 154 at a location M of the length L. In an embodiment, the location M is an area of the beam 152 where the most significant impact loads are likely to be imparted during vehicle impact events.

Figure 15:
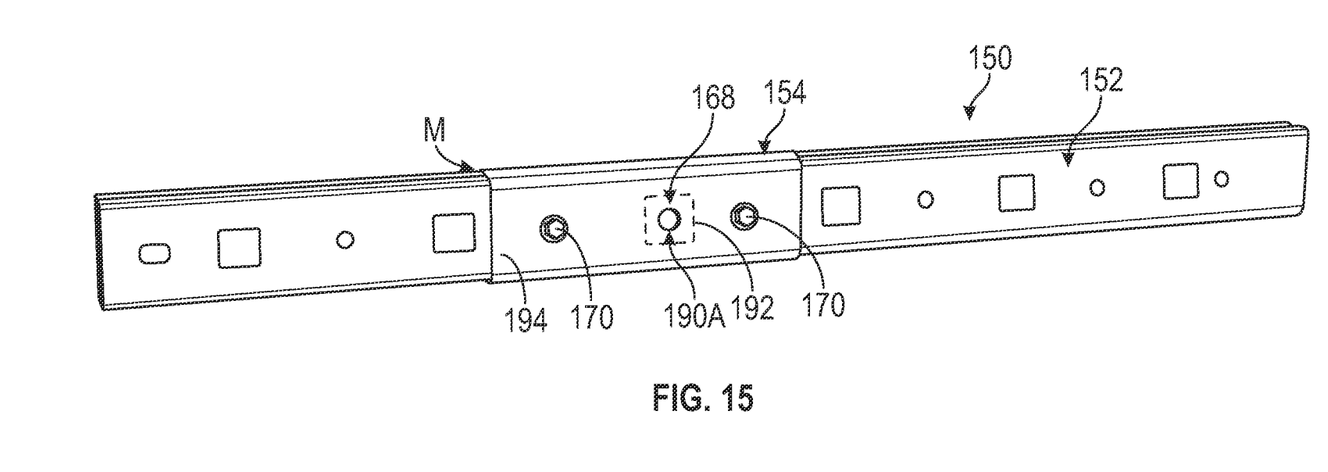
FIG. 15 illustrates an exemplary locating feature for retaining a bracket to a beam of the battery pack reinforcement assembly of FIG. 13.

In an embodiment, shown in FIG. 15, the bracket 154 of the reinforcement assembly 150 includes a locating feature 190A (i.e., a depression tab) for locating the bracket 154 at the location M of the beam 152. The bracket 154 may be slid along the beam 152 until the locating feature 190A contacts a peripheral wall 192 that circumscribes one of the openings of the first plurality of openings 168 of the beam 152 in order to locate the bracket 154 at the location M. In an embodiment, the locating features 190A protrudes inwardly from an outboard surface 194 of the bracket 154.

Figure 16:
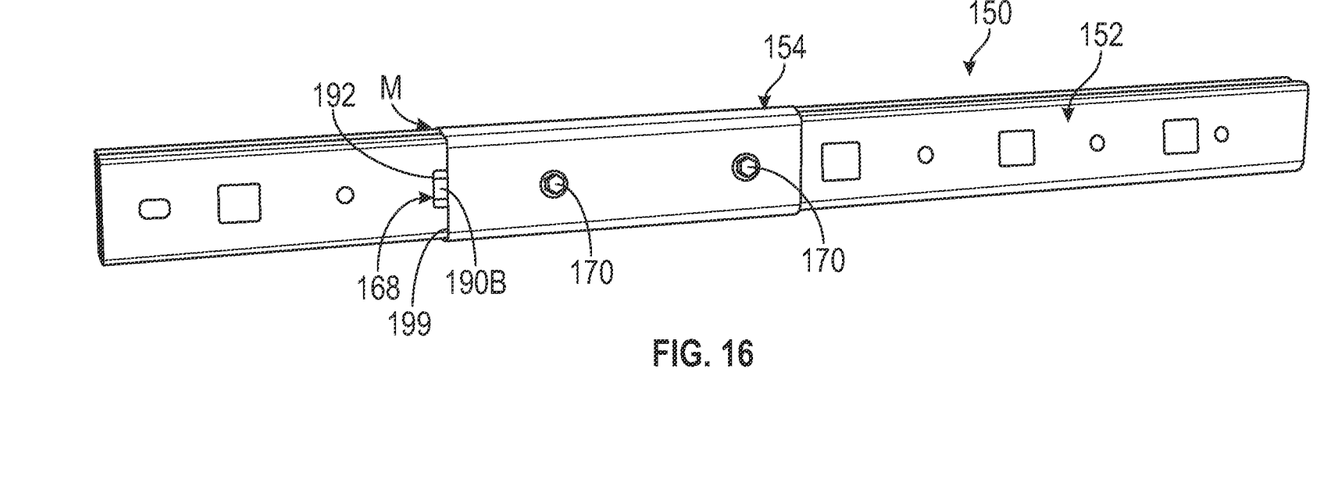
FIG. 16 illustrates another exemplary locating feature for retaining a bracket to a beam of the battery pack reinforcement assembly of FIG. 13.

In another embodiment, shown in FIG. 16, the bracket 154 of the reinforcement assembly 150 includes another locating feature 190B (i.e., a locating tab) for locating the bracket 154 at the location M of the beam 152. The bracket 154 may be slid along the beam 152 until the locating feature 190B contacts the peripheral wall 192 that circumscribes one of the openings of the first plurality of openings 168 of the beam 152 in order to locate the bracket 154 at the location M. In an embodiment, the locating feature 190B protrudes outwardly from an end surface 199 of the bracket 154.

The reinforcement assembly 150 of FIGS. 13-16 may function similarly to reinforcement assembly 50 shown in FIG. 7 during vehicle impact loading events. Due to the ability to slide the bracket 154 to a desired position along the beam 152 prior to fixedly securing the bracket 154, the reinforcement assembly 150 can be employed irrespective of any size or length limitations of the battery pack 18 within the electrified vehicle 10.

The exemplary battery pack reinforcement assemblies of this disclosure provide efficient strategies for managing load paths of underbody mounted battery structures during vehicle impact loading events. The reinforcement assemblies incorporate rigid beams having openings designed to locally deform during impact events, thereby minimizing the transfer of impact loads into the battery pack. The proposed reinforcement assemblies are scalable for use on multiple vehicle platforms and may be retrofitted for use on exiting battery packs. The reinforcement assemblies of this disclosure provide an elegant solution for packaging, serviceability, structural integrity, and impact protection of electrified vehicle battery packs.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
   a battery internal component;
   an enclosure assembly including an interior arranged to house the battery internal component; and
   a reinforcement assembly configured to transfer impact loads away from the interior of the enclosure assembly, wherein the reinforcement assembly includes a beam mounted to the enclosure assembly and a bracket mounted to the beam,
   wherein the beam includes an inboard side surface, an outboard side surface, an upper surface, a lower surface, and a hollow channel,
   wherein the inboard side surface of the beam is mounted directly to an exterior wall of the enclosure assembly,
   wherein the beam includes a first length that is less than a second length of the enclosure assembly.

2. The battery pack as recited in claim 1, wherein the battery internal component is a battery array that includes a plurality of battery cells.

3. The battery pack as recited in claim 1, wherein the beam is an extruded metallic tube having the hollow channel.

4. The battery pack as recited in claim 1, wherein the bracket is a C-shaped metallic bracket.

5. The battery pack as recited in claim 1, wherein the bracket is received in contact with at least three of the inboard side surface, the outboard side surface, the upper surface, and the lower surface of the beam.

6. The battery pack as recited in claim 5, wherein the bracket is received in contact with the outboard side surface, the upper surface, and the lower surface of the beam.

7. The battery pack as recited in claim 1, wherein the beam is mounted to a tray of the enclosure assembly.

8. The battery pack as recited in claim 7, wherein the beam is mounted to an exterior surface of the tray, and the exterior surface is located on an outboard, longitudinal side of the battery pack.

9. The battery pack as recited in claim 1, wherein the beam is mounted to a cover of the enclosure assembly.

10. The battery pack as recited in claim 1, comprising a mounting bracket attached to the enclosure assembly, wherein the reinforcement assembly is unattached to the mounting bracket.

11. The battery pack as recited in claim 10, wherein the mounting bracket extends to a location that is outboard of any portion of the bracket.

12. The battery pack as recited in claim 1, comprising a second reinforcement assembly mounted to the enclosure assembly at a different location than the reinforcement assembly.

13. The battery pack as recited in claim 1, wherein the reinforcement assembly is a separate structure from any structure configured for mounting the battery pack to a vehicle frame.

14. The battery pack as recited in claim 1, wherein the bracket is a sole bracket of the reinforcement assembly.

15. The battery pack as recited in claim 1, wherein the bracket is positioned at a location of the beam that is most susceptible to the impact loads.

16. A vehicle comprising the battery pack of claim 1, wherein the battery pack is mounted to a rail of a vehicle frame by a mounting bracket.

17. The vehicle as recited in claim 16, wherein the beam and the bracket are both separate structures from either the rail or the mounting bracket.

18. A battery pack, comprising:
a battery internal component;
an enclosure assembly including an interior arranged to house the battery internal component; and
a reinforcement assembly configured to transfer impact loads away from the interior of the enclosure assembly and including a beam mounted to the enclosure assembly and a bracket mounted to the beam,
wherein the beam includes an inboard side surface, an outboard side surface, an upper surface, a lower surface, and a hollow channel,
wherein the inboard side surface of the beam is mounted directly to an exterior wall of the enclosure assembly,
wherein the inboard side surface includes a first plurality of openings and the outboard side surface includes a second plurality of openings, wherein the second plurality of openings includes a greater number of openings than the first plurality of openings.

19. A battery pack, comprising:
a battery internal component;
an enclosure assembly including an interior arranged to house the battery internal component; and
a reinforcement assembly configured to transfer impact loads away from the interior of the enclosure assembly and including a beam mounted to the enclosure assembly and a bracket mounted to the beam,
wherein the beam includes an inboard side surface, an outboard side surface, an upper surface, a lower surface, and a hollow channel,
wherein the inboard side surface of the beam is mounted directly to an exterior wall of the enclosure assembly,
wherein the inboard side surface includes a plurality of openings, and the outboard side surface includes a first plurality of openings and a second plurality of openings that are shaped differently than the first plurality of openings.

20. The battery pack as recited in claim 19, wherein a locating feature of the bracket is received within a first opening of the first plurality of openings and a bolt is received within a second opening of the second plurality of openings.

* * * * *